(12) United States Patent
Kumar et al.

(10) Patent No.: US 10,778,478 B2
(45) Date of Patent: Sep. 15, 2020

(54) FAST-SETTLING VOLTAGE REFERENCE GENERATOR FOR SERDES APPLICATIONS

(71) Applicant: Oracle International Corporation, Redwood City, CA (US)

(72) Inventors: Rajesh Kumar, Campbell, CA (US); Seno Judaprawira, San Jose, CA (US); Dawei Huang, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/504,958

(22) Filed: Jul. 8, 2019

(65) Prior Publication Data

US 2019/0334745 A1    Oct. 31, 2019

Related U.S. Application Data

(63) Continuation of application No. 15/954,072, filed on Apr. 16, 2018, now Pat. No. 10,348,535.

(51) Int. Cl.
| | |
|---|---|
| H04L 25/06 | (2006.01) |
| H04L 25/03 | (2006.01) |
| G05F 1/10 | (2006.01) |
| H04B 3/32 | (2006.01) |
| H04L 25/12 | (2006.01) |

(52) U.S. Cl.
CPC .............. *H04L 25/063* (2013.01); *G05F 1/10* (2013.01); *H04B 3/32* (2013.01); *H04L 25/03019* (2013.01); *H04L 25/12* (2013.01)

(58) Field of Classification Search
CPC . H04L 25/063; H04L 25/03019; H04L 25/12; G05F 1/10; H04B 3/32
See application file for complete search history.

(56) References Cited

U.S. PATENT DOCUMENTS

| | | | |
|---|---|---|---|
| 7,792,185 B2 | 9/2010 | Bulzacchelli et al. | |
| 7,961,817 B2 | 6/2011 | Dong et al. | |
| 8,395,446 B1* | 3/2013 | Tran ................. | H03K 19/01837 330/254 |
| 8,599,909 B2 | 12/2013 | Doblar et al. | |
| 9,209,789 B1* | 12/2015 | Li ............................ | H03K 5/02 |
| 9,258,154 B2 | 2/2016 | Hormati et al. | |
| 9,401,800 B1 | 7/2016 | Kang et al. | |
| 9,647,618 B1* | 5/2017 | Yuan ...................... | H03G 3/004 |
| 10,270,409 B1* | 4/2019 | Forey .................... | H03G 3/3078 |
| 2008/0187037 A1* | 8/2008 | Bulzacchelli ............ | G06G 7/18 375/233 |
| 2010/0026342 A1 | 2/2010 | Parameswaran et al. | |
| 2016/0020740 A1* | 1/2016 | Arcudia ..................... | H03F 1/42 330/261 |
| 2019/0341089 A1* | 11/2019 | Sreeramaneni ...... | G11C 29/022 |

* cited by examiner

*Primary Examiner* — Siu M Lee
(74) *Attorney, Agent, or Firm* — Kowert, Hood, Munyon, Rankin & Goetzel, P.C.

(57) ABSTRACT

A reference generator for use with serial link data communication is disclosed. Broadly speaking, a decision circuit may perform a comparison between a particular data symbol included in a serial data stream and a difference between a voltage level of a first signal and a voltage level of a second signal, and generate an output data value based on a result of the comparison. A reference generator circuit may selectively sink a first current value from either the first signal or the second signal based upon another output data value generated from another data symbol included in the serial data stream that was received prior to the particular data symbol.

20 Claims, 11 Drawing Sheets

FAST-SETTLING VOLTAGE REFERENCE GENERATOR FOR SERDES APPLICATIONS

This application is a continuation of U.S. application Ser. No. 15/954,072, filed Apr. 16, 2018 (now U.S. Pat. No. 10,348,535), which is hereby incorporated by reference herein in its entirety.

BACKGROUND

Technical Field

The embodiments disclosed herein relate to high performance computing network systems, and more particularly, to serial data transfers.

Description of the Relevant Art

Computing systems typically include a number of interconnected integrated circuits. In some cases, the integrated circuits may communicate through parallel interfaces, which simultaneously communicate multiple bits of data. In other cases, the integrated circuits may employ a serial interface, which sequentially communicates one or more bits of data at a time. For both parallel and serial interfaces, communicated data may be differentially transmitted.

Parallel interfaces may utilize wide communication buses, i.e., buses that transport data words of 16 bits, 32 bits, 64 bits, or more in parallel. The physical implementation of such communication buses may consume significant area on an integrated circuit or system. Additionally, such buses may be susceptible to various parasitic effects. For example, inductive and/or capacitive coupling between individual wires of a bus may result in signal noise that may reduce a maximum frequency of transmission. Such parasitic effects may become more pronounced with increased operational frequencies and reduced geometric dimensions of the wide buses and associated interconnect. Moreover, impedance mismatch at the end of individual wires of a bus may result in reflection or ringing, further contributing to noise and increased propagation delays to the signals being transmitted.

To remediate problems associated with high-speed parallel data transmission, parallel data may be serialized at the transmission side before transmission, and then deserialized, on the receiver side, upon reception. A pair of Serializer and Deserializer (SERDES) circuits may be employed for this purpose.

SUMMARY OF THE EMBODIMENTS

Various embodiments of a serial data system are disclosed. Broadly speaking, an apparatus and a method are contemplated, in which a first current source may be configured to sink a first current from a first output node, wherein a value of the first current is based upon a value of a first control signal, and first output node is coupled to a power supply via a first resistor. A second current source may be configured to sink a second current from a second output node, wherein a value of the second current is based upon the value of the first control signal, and the second output node is coupled to the power supply via a second resistor. A third current source may be configured to sink a third current, wherein a value of the third current is based upon a value of a second control signal. A first device may be configured to couple the third current source to the first output node using a third control signal and a second device may be configured to couple the third current source to the second output node using a fourth control signal, where the third and fourth control signals are based upon a data symbol included in a serial data stream transmitted via a serial communication link.

In one embodiment a fourth current source is coupled to the first output node, and a fifth current source coupled to the second output node. A value of the fourth current source, and a value of the fifth current source are fixed.

In another non-limiting embodiment, a resistor network may be configured to generate a common mode voltage based on a voltage level of the first output node, and a voltage level of the second output node.

Figure 1:
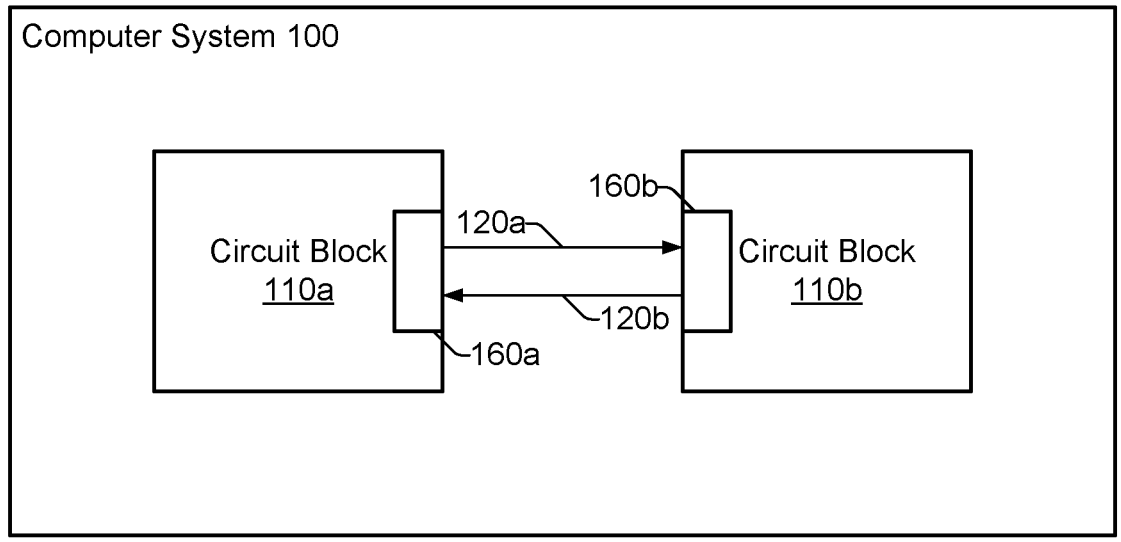
FIG. 1 is a generalized block diagram illustrating an embodiment of a computer system.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In some computing systems, data may be transmitted in a serial fashion from one functional unit to another functional unit. By employing serial data transfers, a computing system may reduce area and power consumption associated with wide parallel data transfer techniques. When employing serial data transfers, each functional unit may employ Serializer and Deserializer (SERDES) circuits, which may be configured to convert parallel data in a functional unit to serial data for transmission, and convert, received serial data back to parallel data, respectively. SERDES circuits may be used in various applications. For example, fiber optic communication systems, gigabit Ethernet systems, and cache coherence links in chip multi-threading (CMT) systems with multiple nodes may employ SERDES circuits.

When receiving serial data, the data may become distorted due to the physical properties of the serial data link channel. In some cases, a particular data symbol may be distorted by previously transmitted symbols. This type of distortion is commonly referred to as Intersymbol Interference, or "ISI." When a particular symbol spreads beyond it allotted time interval, it interferes with adjacent symbols. ISI may be caused by multipath propagation or the inherent non-linear frequency response of the serial link channel, which may cause successive symbols to blur together. To remediate the effects of ISI, multiple techniques, such as, e.g., adaptive equalization may be employed. In some cases, a reference voltage used to compare against the received symbols may be adjusted to account for the interference. When the reference voltage is adjusted, however, it may not be possible to receive data while the reference voltage settles to its new value. The embodiments illustrated in the drawings and described below may provide techniques for adjusting the voltage reference while minimizing settling time.

Referring to FIG. 1, a generalized block diagram illustrating one embodiment of a computing system 100 is shown. Computing system 100 may include circuit block 110a coupled to circuit block 110b through serial communication channels 120a and 120b using interface units 160a and 160a. In various embodiments, a series of data symbols (or simply "symbols") may be transmitted via serial communication channels 120a and 120b. As used and described herein, a symbol is a single voltage level or a differentially encoded voltage level that corresponds to a particular logic value, such as, a logical-0, for example.

As used and described herein, a low logic level or logical-0 value refers to a voltage level at or near ground potential, and a high logic level or logical-1 value refers to a voltage sufficiently large to turn on an n-channel metal-oxide semiconductor field-effect transistor (MOSFET) and turn off a p-channel MOSFET. In other embodiments, different technologies may result in different voltage levels for high and low logic levels.

In various embodiments, either of circuit block 110a or circuit block 11b may include one or more processor cores. In some embodiments, the processor cores may implement any suitable instruction set architecture (ISA), such as, e.g., SPARC, PowerPC™, or x86 ISAs, or a combination thereof. Either of circuit blocks 110a-b may include one or more bus interfaces (not shown) which may allow circuit blocks 110a-b to communicate to other circuit blocks or functional units within computing system 100. It is noted that the arrangement of circuit blocks within computing system 100 depicted in FIG. 1 is merely an example. In other embodiments, other arrangements are possible.

Either of circuit blocks 110a or 110b may correspond to system memory within computing system 100. Alternatively, or additionally, circuit blocks 110a or 110b may also include a storage device such as, e.g., any suitable hard disk drive. Although a hard disk drive is used as an example, any storage medium may be contemplated, such as, e.g., solid-state drives, optical drives, or main memory, such as, dynamic or static RAMs, for example.

In some embodiments, serial communication channels 120a and 120b may include only differential data pairs with no dedicated clock signal, while, in other embodiments, a clock signal may be included with the data signals. Since circuit block 110a and circuit block 110b may not be physically located on a same circuit board, the two circuit blocks may not share a single clock source. In such cases, the transmitting block may encode a clock signal within the data stream.

Serial communication channels 120a and 120b (also referred to herein as "lanes") may conform to one or more high speed serial standards and include a copper wire or optical fiber cable with multiple conductive paths coupled between circuit blocks 110a and 110b. Serial communication channel 120a may be a unidirectional path from circuit block 110a to circuit block 110b and conversely serial communication channel 120b may be a unidirectional path from circuit block 110b to circuit block 110a. In other embodiments, other standards may be employed, and serial communication channels 120a and 120b may be bidirectional. In some embodiments, parallel data may be serialized prior to transmission across a respective channel/lane.

During operation, circuit block 110a may initiate a connection to circuit block 110b. To initiate a connection, a process referred to as channel training, or link training, may be utilized to configure interface units 160a and 160b for transmitting data via serial channels 120a-b. Circuit block 110a may send a stream of symbols to circuit block 110b via interface unit 160a. Interface unit 160b may sample the stream of symbols, using a reference voltage, until data timing requirements can be derived. Once timing requirements are derived, interface unit 160b may calculate one or more characteristics that will be sent to interface unit 160a to be used to adjust how interface unit 160a transmits data to interface unit 160b. As described below in more detail, a value of the voltage references included in interface units 160a and 160b may be adjusted during the operation of serial communication channels 120a-b.

While training is being performed on serial communication channel 120a, a similar process may be performed to initiate and configure serial communication channel 120b, with circuit block 110b sending the stream of symbols and circuit block 110a receiving the symbols, deriving data timing requirements. It is noted that although, in the above embodiment, training is concurrently performed on serial channels 120a-b, in other embodiments, training may be performed on each channel in a serial fashion.

It is noted the embodiment of FIG. 1 is merely an example. In other embodiments, different numbers of communication links and different configurations of communication links may be employed.

Figure 2:
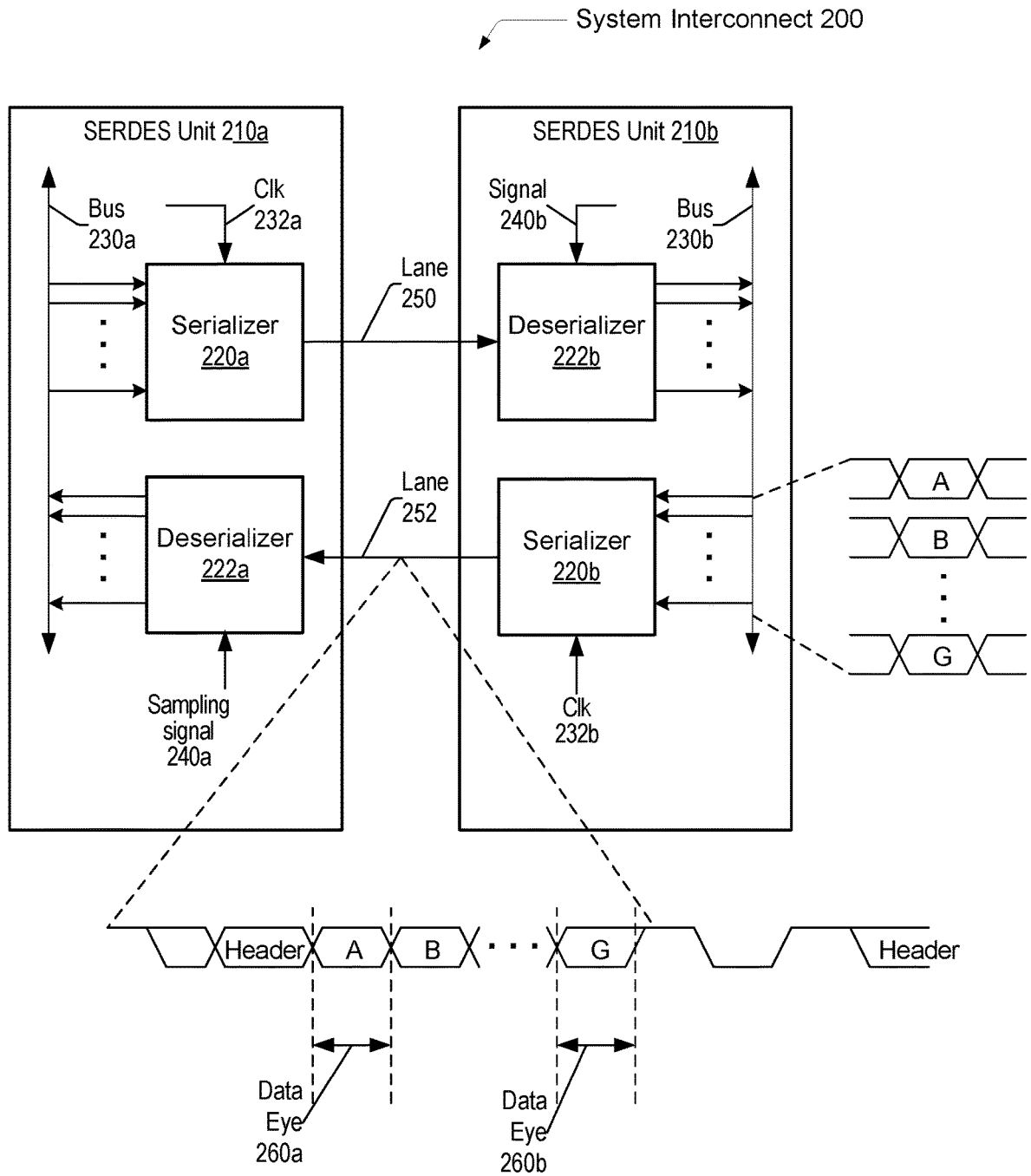
FIG. 2 is a generalized block diagram illustrating an embodiment of a system interconnect.

Referring to FIG. 2, a generalized block diagram depicting an embodiment of system interconnect is illustrated. In the illustrated embodiment, system interconnect 200 includes SERDES units 210a-210b. It is noted that although two units are depicted in FIG. 2, other embodiments may include suitable number of units. In various embodiments, SERDES units 210a and 210b may correspond to interface units 160a and 160b of FIG. 1, respectively. SERDES units 210a and 210b are coupled via lanes 250 and 252. In some embodiments, lanes 250 and 252 may employ differential signalling, while, in other embodiments, data may be transmitted on lanes 250 and 252 in a single-ended fashion.

Parallel information within a given one of the SERDES units 210a-210b may include control, status, address, parity, and data values. The parallel information may be placed on a respective one of the buses 230a-230b. The parallel information may be serialized before transmission on a given one of the lanes 250 and 252. For example, parallel data from bus 230a may be serialized by serializer 220a, using clk 232a, before transmission on lane 250. The serialized information may be de-serialized by a deserializer block, such as, e.g., deserializer 222b, upon reception.

SERDES units transform wide bit-width, single-ended signal buses and compress them to a few, typically one, differential signal that switches at a much higher frequency rate than the wide single-ended data bus. SERDES units may allow a large amount of data to be moved point-to-point. One of multiple SERDES architectures may be selected to perform the high-speed serialized data transmission. For example, the parallel clock SERDES architecture, the embedded clock bits SERDES architecture, the 8-bit/10-bit (8b/10b) or comma encoded SERDES architecture, and the bit interleaving SERDES architecture are some examples of SERDES architectures to use for data transmission.

In the embodiment shown, the SERDES units 210a-210b utilize an architecture with embedded clock information. Another architecture may, however, employ a dedicated clock signal. SERDES unit 210b is the transmitter for lane 252. The serializer 220b serializes the parallel information on the bus 230b. The parallel information is generally shown as data A, B, through G. Serializer 220b additionally receives the clock signal 232b. The serializer 220b combines the data A through G, and the clock signal 232b into a set of serial data bits to be transmitted on lane 252.

In various embodiments, the serialized data word with the data A through G may include a leading header to indicate valid data is being transmitted. In some embodiments, the serialized word may not contain an explicit clock signal. In such cases, serializer 220b may periodically send predetermined data to deserializer 222a that may be used for tuning both the data and clock recovery circuits. Such data may be preceded by a a different leading header indicating that training data follows. In some embodiments, different types and amounts of training data may be employed.

Deserializer 222a may utilize one of various algorithms for recovering the explicit data and implicit clock information in the serialized data words being received. Deserializer 222a may attempt to sample the serialized words in a manner to determine the width and height of the data eyes in the serialized word. A data eye is a name for a range of sample times and sample voltage thresholds inside of which a stream of data bits may be correctly read. This may also be referred to as a data valid time. The data eyes 260a-260b are two representative data eyes in the serialized word. Deserializer 222a may detect deviations from the expected width of a given data eye and an expected amplitude of received data signals. Such deviations may be used to adjust data and clock recovery circuits and to determine clock jitter, clock phase differences, clock frequency drifts, and so forth. The clock data recovery (CDR) circuits in deserializer 222a (not shown) may make adjustments on internal clock phases based on received data serialized words and place the sampling signal 240a transition edge in the middle of received data eyes to maximize the timing margin. Deserializer 222b may perform similar steps.

The SERDES units may attempt to place the transitioning edges of the receiving clock signals in the middle of the data eyes, such as data eyes 260a and 260b, for maximum timing margin. Due to channel loss, reflection and crosstalk, the received data serialized words at the deserializers 222a and 222b may be significantly distorted. The receiver circuits may recondition and equalize the received signals to maintain a desired bit error rate (BER), i.e., the number of bits received with the wrong value versus the number of total bits received for a predetermined period of time. The equalization settings may be adapted and may be based on the channel properties. Once locked, deserializer 222a may recover the serialized data values in the serial stream.

An appreciable amount of time may be consumed to initialize and configure the SERDES units before high-speed data communication begins. To initialize a connection, a process referred to as channel training may be utilized to configure serializers 220a and 220b, as well as deserializers 222a and 222b. As used and described herein, a training process includes adjusting the sampling of received test data to reduce an error rate to a desired level. For example, to initialize lane 252, serializer 220b may send a stream of bits to deserializer 222a. The series of bits may be known to both SERDES unit 210a and SERDES unit 210b in advance. In some embodiments, the stream of bits may be a consistent string of bits and may be repeated as necessary until the training is complete. In other embodiments, the stream of bits may be the output of a deterministic function, such as a pseudo-random bit sequence, which may be sent continuously until training is complete. Deserializer 222a may sample the stream of bits until the beginning and end of the data eye can be derived. Different training operations may include different amounts of data and employ different amounts of time to adjust the sampling by a receiving circuit.

It is noted that the embodiment illustrated in FIG. 2 is merely an example. In other embodiments, different configurations and combinations of serializers and deserializers are possible and contemplated.

Figure 3:
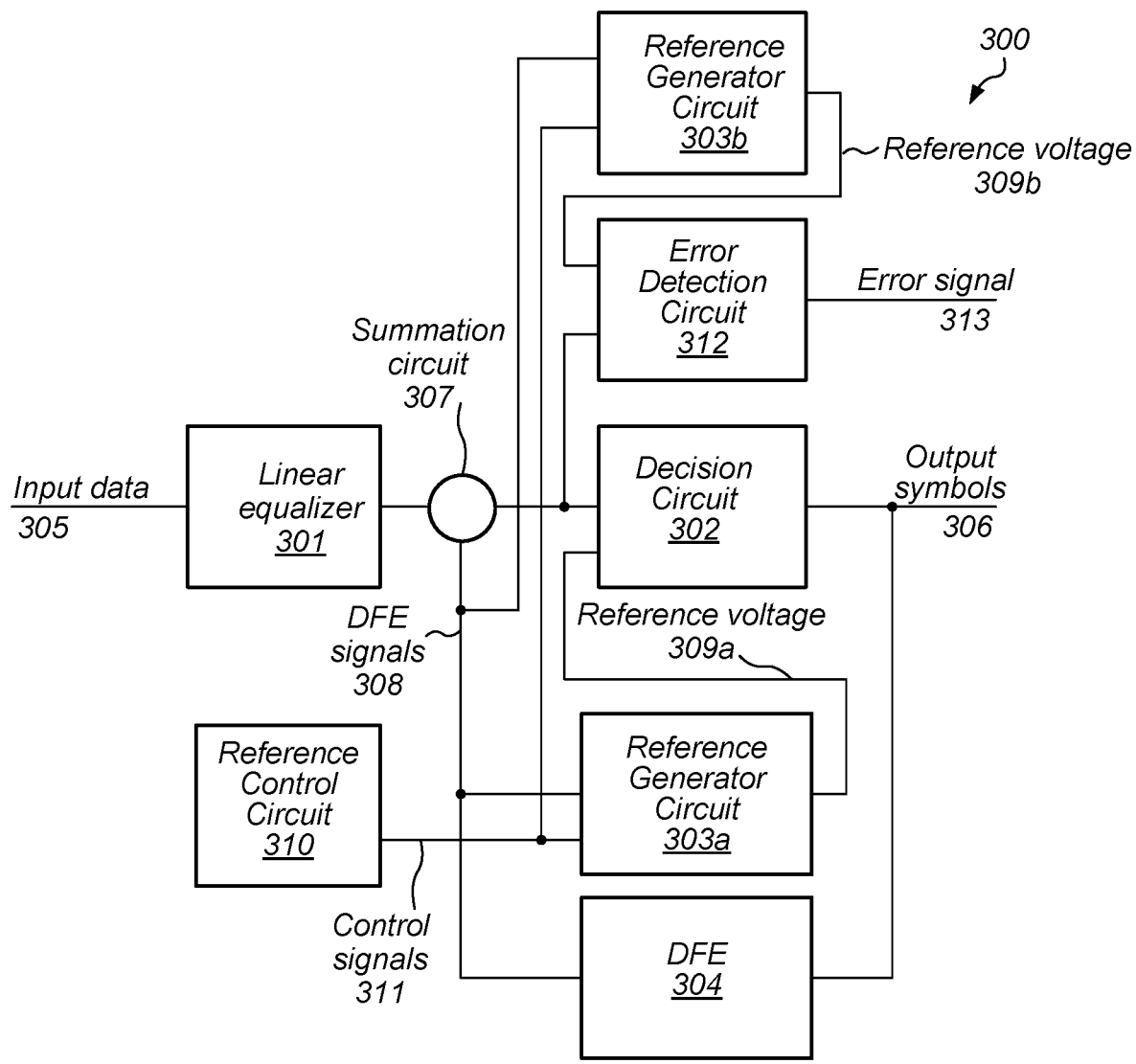
FIG. 3 illustrates a block diagram depicting an embodiment of a de-serialization circuit.

Turning to FIG. 3, an embodiment of a de-serialization circuit is illustrated. In various embodiments, de-serializer circuit 300 may correspond to de-serializer circuit 222b as depicted in the embodiment of FIG. 2. In the illustrated embodiment, de-serializer circuit 300 includes linear equalizer 301, decision circuit 302, reference generator circuits 303a and 303b, decision feedback equalizer (DFE) 304, summation circuit 307, reference control circuit 310, and error detection circuit 312.

Linear equalizer 301 is configured to receive input data 305 and generate an estimate of the serial data link (or channel) inverse transfer function. Linear equalizer 301 may be designed according to various design methodologies. For example, in some embodiments, linear equalizer 301 may include a finite impulse response (FIR) filter. In some cases, coefficients included in the FIR filter may be updated using a Least Mean Squares (LMS) algorithm.

In various embodiments, input data 305 may be differentially encoded using multiple signal wires, Alternatively, input data 305 may single-ended data where voltage level on a signal wire corresponds to a particular symbol.

Decision circuit 302 may be configured to receive the output of summation circuit 307 along with reference voltage 309a in order to determine a logical value for a particular symbol included in input data 305, and generate output symbols 306. In various embodiments, decision circuit 302 may include a differential amplifier, comparator, or other suitable circuit configured to compare a voltage level of summation circuit 307 and reference voltage 309a.

DFE 304 may include any suitable combination of logic circuits configured to filter output symbols 306 and generate DFE signals 308, which may include an estimate of the current channel value. In various embodiments, DFE signals 308 may be subtracted from the output of the linear equalizer 301 by summation circuit 307.

In various embodiment, DFE 304 may estimate of the impulse response of the channel or of the convolution of the channel with the linear equalizer, if a linear equalizer is used as well. In some cases, the DFE coefficients may be updated with the LMS algorithm.

Each of reference generator circuits 303a-b are configured to generate reference voltages 309a and 309b, respectively. As described below in more detail, reference generator circuit 303a-b may adjust their respective reference voltages based on DFE signals 308 by varying an amount of current sunk from a pair of circuit nodes, which differentially encoded the respective reference voltages. By adjusting reference voltages 309a-b in such a fashion, the time during which the de-serialization circuit is adjusting the reference voltages may be reduced allowing for improve communication performance over a serial link. It is noted that although two reference generator circuits are depicted in the embodiment of FIG. 3, in other embodiments, a single reference generator shared by decision circuit 302 and error detection circuit 312 may be employed.

Error detection circuit 312 may be configured to compare the output of summation circuit 307 and reference voltage 309b and generate error signal 313. Based on results of the comparison, error detection circuit 312 may determine whether the reference voltages need to be increased or decreased in value to reduce ISI. Additionally, the magnitude of the voltage references may also be determined.

Reference control circuit 310 may include any suitable combination of logic circuits configured to generate control signals 311. In various embodiments, control signals 311 may be used to set the common mode operating point of the reference generators circuits 303a-b. Reference control circuit 310 may use data gathered from a training operation or other suitable startup operation to determine appropriate values for control signals 311.

It is noted that the embodiment depicted in FIG. 3 is merely an example. In other embodiments, difference circuit blocks, and different arrangements of circuit blocks may be employed.

Figure 4:
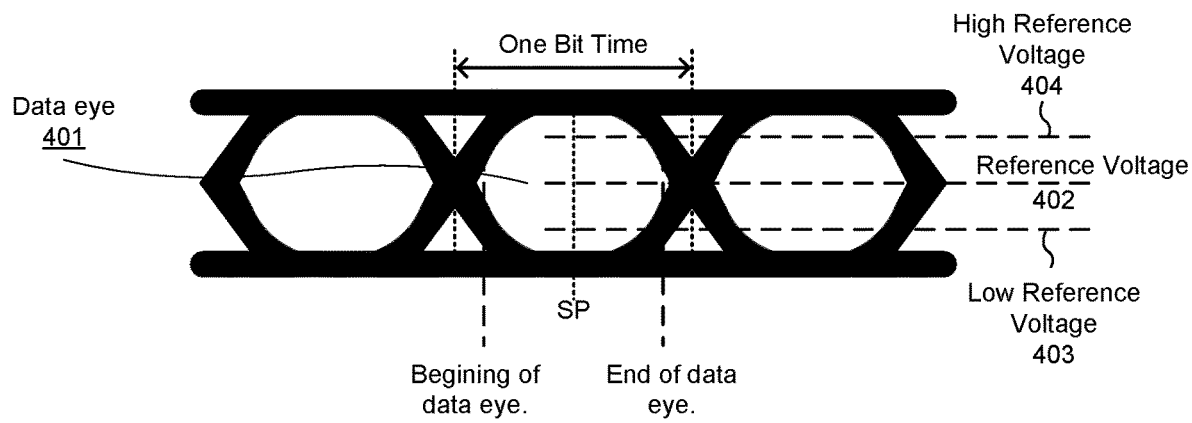
FIG. 4 is a representation of a timing diagram illustrating a data eye resulting from serialized data transmissions.

Turning now to FIG. 4, a representation of a timing diagram of a data eye resulting from serialized data transmissions is illustrated. The timing diagram represents the voltage of the differential data lines over time for many data bits as may be received by a deserializer, such as, e.g., deserializer 222a as illustrated in FIG. 2. The thickness of the black lines illustrates the range of the voltage of the differential data lines due to various factors that may couple noise into the lines or create jitter from bit to bit over time. In the timing diagram of FIG. 4, a data stream is illustrated with data eye 401, corresponding to the white space in the middle. Generally speaking, the larger and more well-defined a data eye is, the lower the BER and more reliable the communications may be.

In this example, the space from the beginning of data eye 401 to the end of data eye 401 is large compared to the overall bit time. A large window is available for deserializer 222a to set sampling signal 240a as described above. Sampling signal 240a may be set to align with a sampling point (SP) midway between the beginning and end of the data eye.

During operation, a voltage level of each of the differential data lines may be compared to reference voltage 402 to determine the logical value of the transmitted data bit. The comparison may be performed at the sampling point as set by the aforementioned training operations. In various embodiments, interference from previously received symbols, i.e., ISI, may result in a incorrect determination of the logical value of the current symbol. To compensate for such interference, the reference voltage may be changed. For example, reference voltage 402 may be increased in value resulting in high reference voltage 404, or reference voltage 402 may be reduced in value resulting in low reference voltage 403. In various embodiments, the change in voltage level may be made on a symbol-by-symbol basis, and may be based on, at least in part, on output signals generated by a DFE, such as, DFE 304, for example.

It is noted FIG. 4 is merely an example of the timing and shape of a data eye. In various embodiments, data eyes may be observed in a variety of shapes and sizes based upon the characteristics of an individual SERDES link. For example, speed of the bit data rate, format of the data, clock jitter, EMI, impedance of the connection, and length of the connect are just a few factors that may determine the actual shape of a data eye in any SERDES link.

Figure 5:
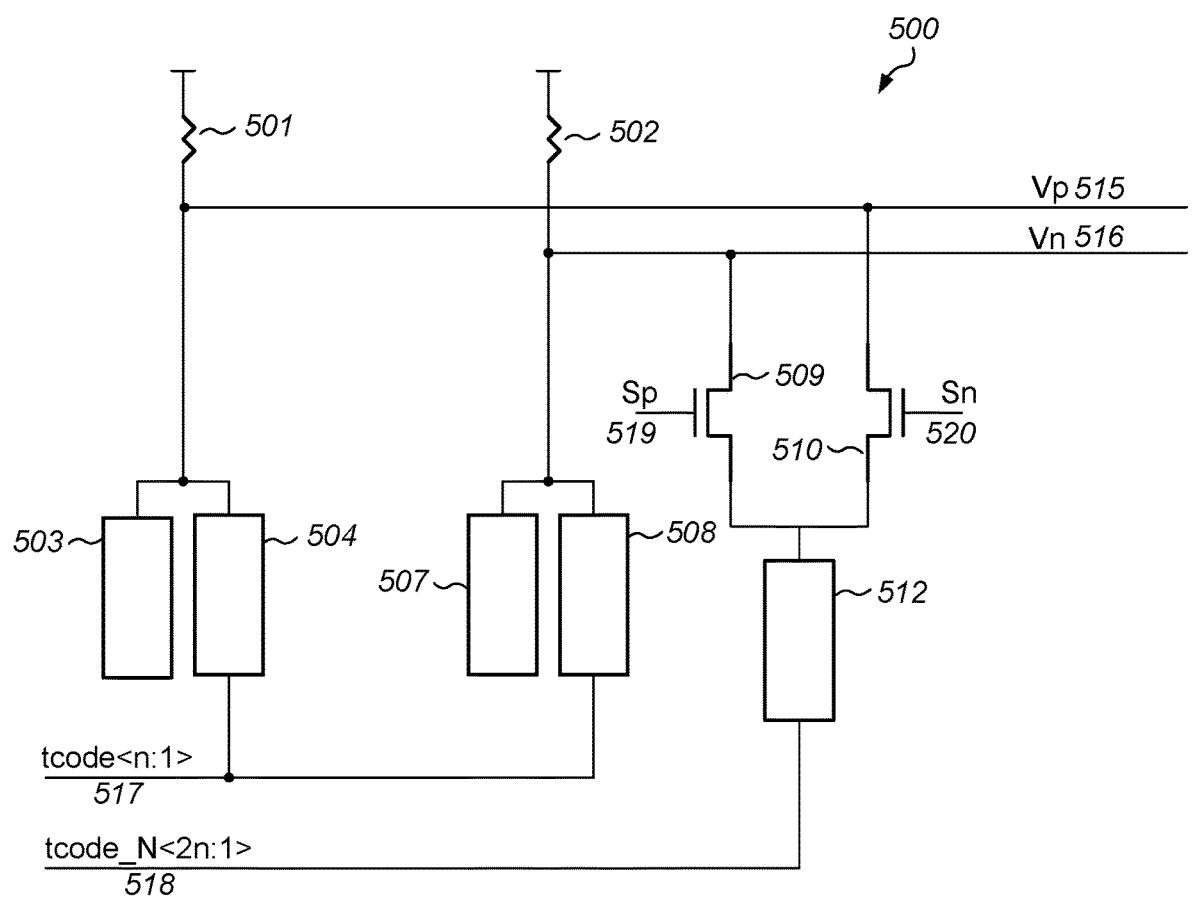
FIG. 5 is a block diagram of an embodiment of a reference voltage generator circuit.

As described above in regard to FIG. 4, different reference voltages may be employed in determining a logical value for a particular data symbol in a serial data stream. An embodiment of a circuit for generating such reference voltages is depicted in FIG. 5. Reference voltage generator 500 may, in various embodiments, correspond to reference generator circuit 303 as depicted in the embodiment of FIG. 3. In the illustrated embodiment, reference voltage generator 500 may be configured to generate voltages Vp 515 and Vn 516 based on signals Sp 519, Sn 520, tcode<n:1> 517, and tcode_N<2n:1>, where n is a positive integer corresponding to a number of available current sources in current sources 504, 508, and 512. It is noted that the number of available current sources in current source 512 may be twice that of current sources 504 and 508.

In the present embodiment, resistors 501 and 502 are coupled the power supply and to Vp 515 and Vn 516, respectively. A difference in the voltage levels between Vp 515 and Vn 516 may be used a voltage reference in a serial communication application, or any other suitable application. In various embodiments, resistors 501 and 502 may be polysilicon, metal, or any other suitable type of material available on a semiconductor manufacturing process that may be employed for creating resistors of a desired value.

Devices 509 and 510 are coupled to Vn 516 and Vp 515, respectively, as well as current source 512, which is, in turn coupled to current source 512. Device 509 is controlled by Sp 519, and device 510 is controlled by Sn 520. In various embodiments, signals Sp 519 and Sn 520 may be logical inverses of each other, and may correspond to DFE signals 308 as depicted in the embodiment of FIG. 3.

In various embodiments, each of devices 509 and 510 may include one or more n-channel metal-oxide semiconductor field-effect transistors (MOSFETs), or any other suitable transconductance devices.

As described below in more detail, current sources 503 and 507 are configured to sink a particular current value from Vp 515 and Vn 516, respectively. As the current is sunk from Vp 515 and Vn 516, voltage levels are dropped across resistors 501 and 502, which, in turn, sets a common mode operating point for Vp 515 and Vn 516.

Current sources 504 and 508 are configured to sink a current from Vp 515 and Vn 516 based upon a value of tcode<n:1> 517. In various embodiments, tcode<n:1> 517 may correspond to control signals 311 as depicted in the embodiment of FIG. 3, and may be set based on results of a training operation performed on a serial link. Each individual signal wire included in tcode<n:1> 517 may activate a corresponding current source in current sources 504 and 508, thereby setting the overall current for each of current sources 504 and 508. For example, the common mode operating point for Vp 515 and Vn 516, $V_{cm}$, is function of the overcall current for a particular signal and the value of the corresponding resistor as depicted in equation 1, where I is the combined current of current source 503 and current source 504, VDD is the voltage level of the power supply, and R is the value of resistor 501.

$$V_m = VDD - IR \quad (1)$$

Current source 512 includes, in various embodiments, at least twice the number of current sources that either of current sources 504 and 508. As with current sources 504 and 508, individual current sources included in current source 512 may be activated based on a value of individual signals included in tcode_N<2n:1> 518. During operation, the current value selected by tcode_N<2n:1> 518 will be sunk from either Vp 515 and Vn 516 based upon the values of Sp 519 and Sn 520. For example, in equations 2 and 3, the values for Vp 515 and Vn 516 are depicted for the case where Sp 519 is a logical-0 and Sn 520 is a logical-1, wherein $V_p$ is the voltage of Vp 515, $V_n$ is the voltage of Vn 516, $V_{cm}$ is the common mode operating point, I is the current of a particular leg in current source 512, n is the number of legs active in current source 512 (as defined by the value of tcode_N<2n:1>, and R is the resistance of either resistor 501 or 502.

$$V_p = V_{cm} + InR \quad (2)$$

$$V_n = V_{cm} - InR \quad (3)$$

It is noted that the embodiment depicted in FIG. 5 is merely an example. In other embodiments, different numbers of devices, and different arrangements of devices may be employed.

Figure 6A:
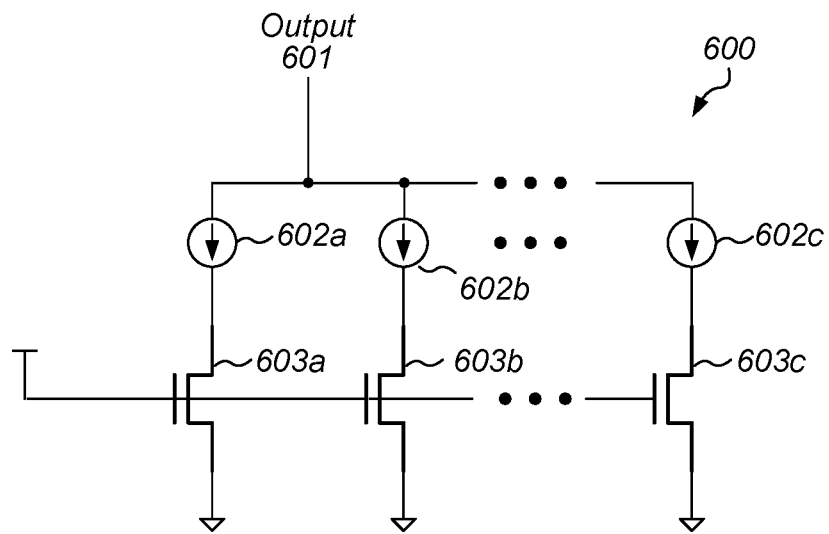
FIG. 6A is a block diagram of a fixed current source.

Turning to FIG. 6A, an embodiment of a fixed current source is illustrated. In various embodiments, current source 600 may correspond to either of currents sources 503 or 507 in the embodiment illustrated in FIG. 5. In the illustrated embodiment, current source 600 includes current sources 602a-c, and devices 603a-c.

Current sources 602a-c are each coupled to output 601, and to a respective one of devices 603a-c. In various embodiments, current sources 602a-c may include a biased device, portion of a current mirror, or any other suitable circuit configured to generate a desired current. The value of current sources 602a-c may, in some embodiments, be substantially the same. Although only three current sources are depicted in the embodiment of FIG. 6A, in other embodiments, any suitable number of current sources may be employed.

Each one of devices 603a-c is coupled to a respective one of current sources 602a-c. A control terminal of each of devices 603a-c is coupled to a positive power supply node (commonly referred to as "VDD"). In various embodiments, each of devices 603a-c may include one or more n-channel MOSFETs, or any other suitable transconductance device. Although only three devices are depicted in current source 600, in other embodiments, any suitable number of devices may be employed.

During operation, a current is sunk from output 601 by each of current sources 602a-c. Each current flows to a ground supply node (commonly referred to as "VSS") via a corresponding one of devices 603a-c. It is noted that the embodiment depicted in FIG. 6 is merely an example, and that, in other embodiments, different circuit elements, and different arrangements of circuits elements may be employed.

As described above regarding FIG. 5, both fixed and variable current sources may be employed to generate the desired reference voltage level. An embodiment of a variable current source is illustrated in the block diagram of FIG. 6B. In various embodiments, current source 605 may correspond to any of current sources 504, 508, and 512. It is noted that in cases where current source 605 corresponds to current source 512, additional devices and current sources may be employed.

In the illustrated embodiment, current source 605 includes current sources 607a-c and devices 608a-c. Each of current sources 607a-c is coupled to output 606 and to a respective one of devices 608a-c. In various embodiments, each of current sources 607a-c may include a biased device, a portion of a current mirror, or any other suitable circuit configured to provide a desired current value.

Each device of devices 608a-c is coupled to a corresponding one of current sources 607a-c, and is controlled by a respective one of tcode<1:n> 609, where n corresponds to a number of individual signal wires included in the composite signal. In various embodiments, each of devices 608a-c may include one or more n-channel MOSFETs, or any other suitable transdconductance devices.

During operation, one or more of the individual signal wires included in tcode<1:n> 609 may be set to a high logic value. The devices included in devices 608a-c controlled by the signals set to the high logic value may be activated allowing current generated by the corresponding current sources of current sources 607a-c to be sunk from output 606. The devices included in devices 608a-c whose corresponding control signals remain at a low logic level, will be inactive preventing a flow of current from output 606 via corresponding current sources of current sources 607a-c.

Figure 6B:
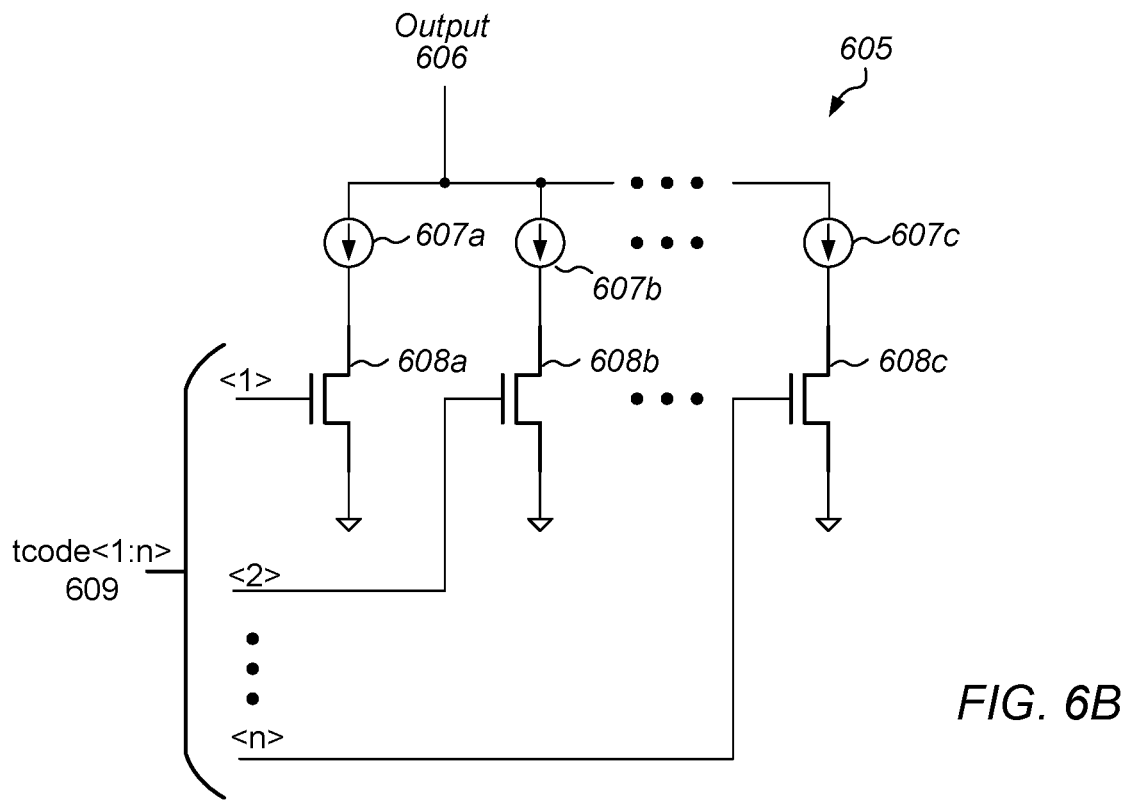
FIG. 6B is a block diagram of a variable current source.

It is noted that the embodiment illustrated in FIG. 6B is merely an example. In other embodiments, different circuit elements, and different arrangements of circuit elements are possible and contemplated.

Figure 7:
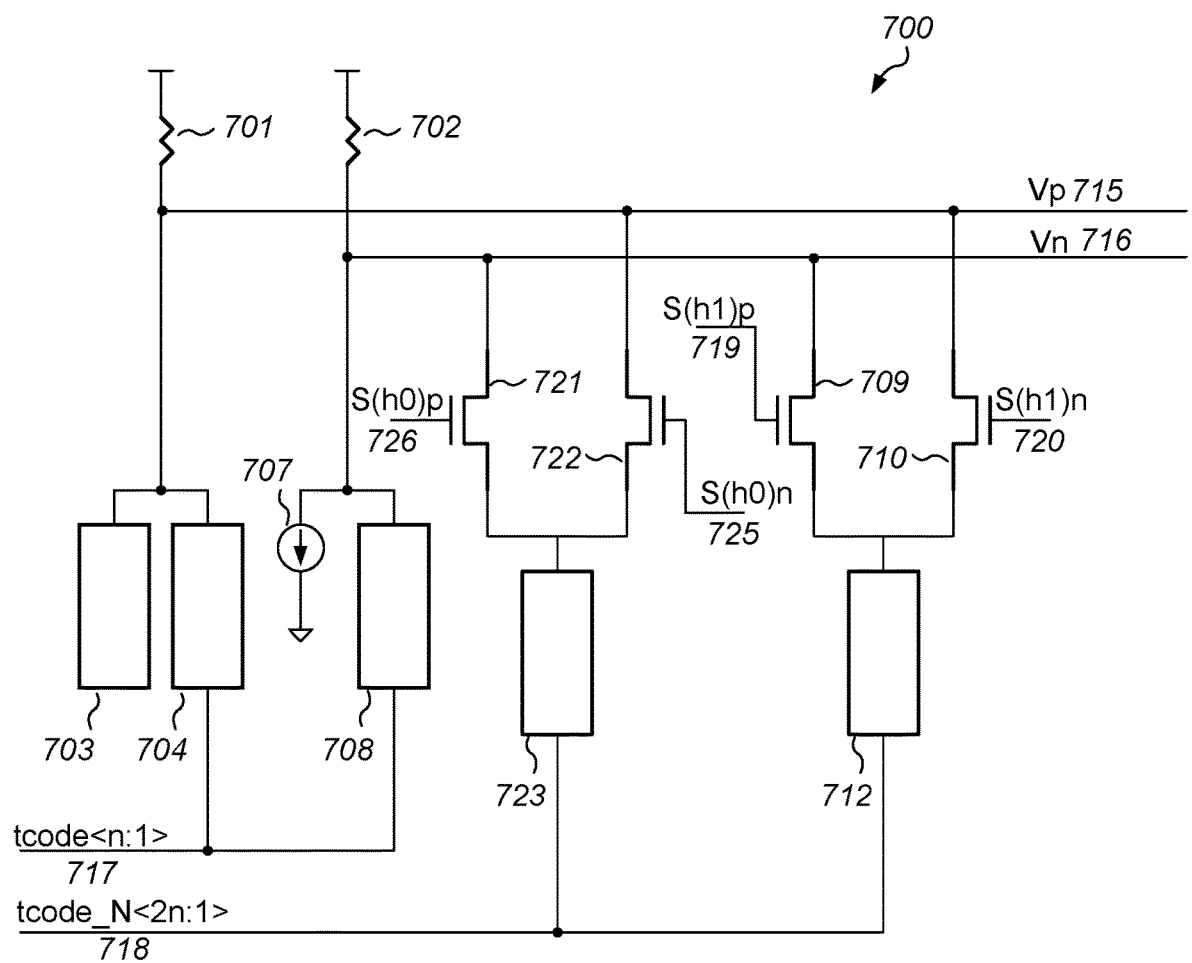
FIG. 7 is a block diagram of another embodiment of a reference voltage generator circuit.

When cancelling ISI, it may be desirable to use results from more than one previously received symbol. To allow for this, the voltage reference is adjusted based on multiple previously received symbols. An embodiment of a reference generator circuit that allows for using multiple previously received symbols is illustrated in FIG. 7. In various embodiments, reference generator 700 may correspond to either of reference generator circuits 303a-b as illustrated in the embodiment of FIG. 3.

In the illustrated embodiment, Vp 715 is coupled to resistor 701 and current sources 703 and 704, and Vn 716 is coupled to resistor 702 and current sources 707 and 708. As described above in regard to FIG. 5, current sources 703 and 707 may be configured to sink a fixed current value from Vp 715 and Vn 716, respectively. Also, as described above in regard to FIG. 5, current sources 704 and 708 are configured to sink a current, whose value depends on tcode<n:1> 717, from Vp 715 and Vn 716, respectively.

In contrast to the embodiment of FIG. 5, two current sources, whose values are based on the value of tcode_N<2n:1>, are employed. Current source 723 is coupled via devices 721 and 722 to Vn 716 and Vp 715, respectively. Devices 721 and 722 are controlled by S(h0)p 726 and S(h0)n 725, respectively, which are based a first previously received symbol designated "h0." In various embodiments, S(h0)p 726 and S(h0)n 725 may be generated by a DFE, such as, DFE 304 as illustrated in FIG. 3, for example.

Additionally, current source 712 is coupled via devices 709 and 710 to Vn 716 and Vp 715, respectively. Devices 709 and 710 are controlled by signals S(h1)p 719 and S(h1)n 720, respectively, which are based on a second previously received symbol designated "h1." In various embodiments, signals S(h1)p 719 and S(h1)n 720 may be generated by a DFE, such as, DFE 304 as depicted in FIG. 3, for example.

During operation, a current will be sunk from one of Vp 715 and Vn 716 by current source 723 based on the value of the h0 symbol, and another current will be sunk from one of Vp 715 and Vn 716 by current source 712 based on the value of the h1 symbol. By employing two symbols, a more accurate cancellation of ISI may be possible, in some embodiments.

It is noted that the embodiment illustrated in FIG. 7 is merely an example. In other embodiments, different circuits and different arrangements of circuits may be employed.

Figure 8:
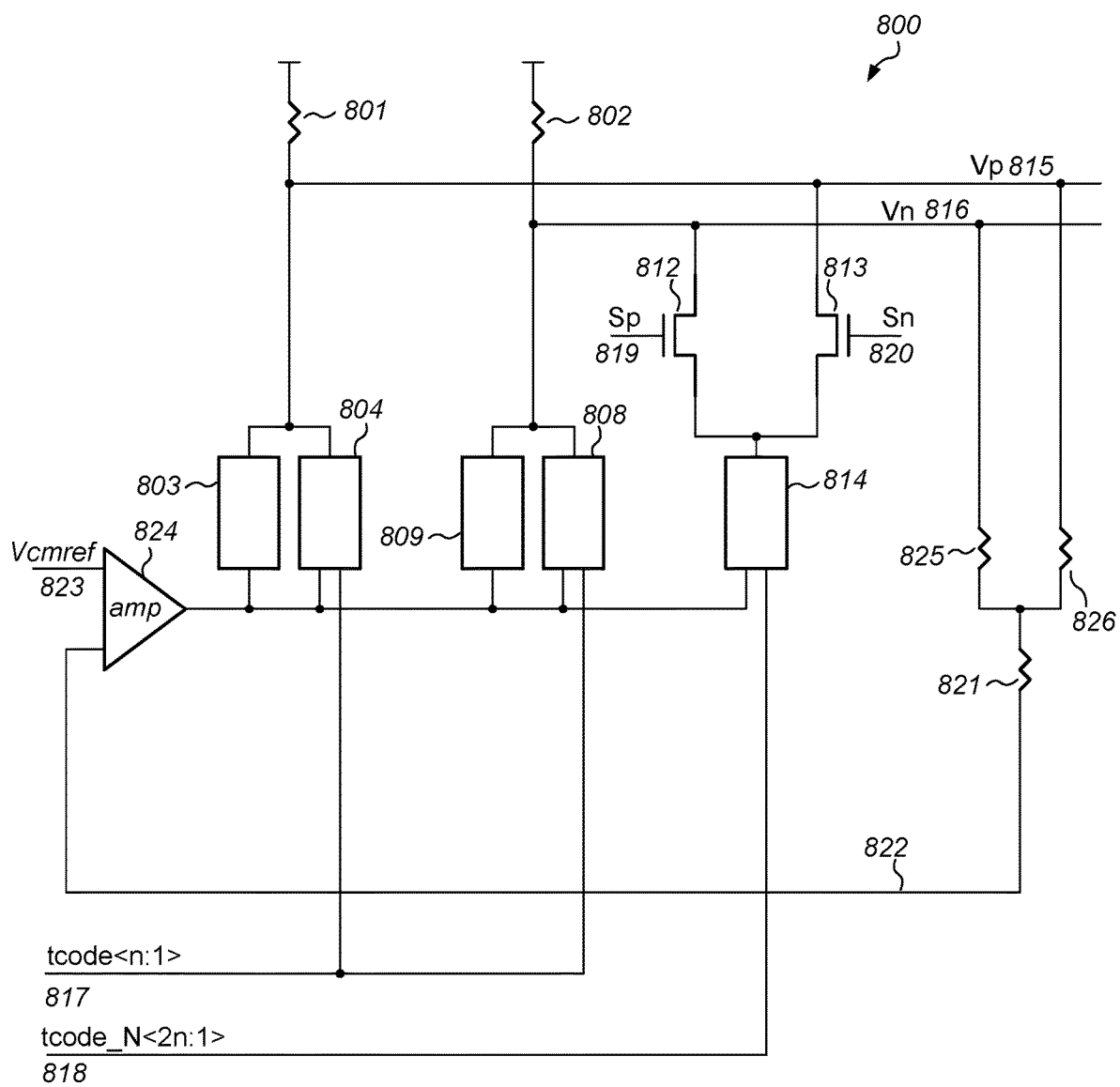
FIG. 8 is a block diagram of an embodiment of a reference voltage generator with common mode output compensation.

In some cases, it is may be desirable to limit variations in the common mode operating point of the differentially encoded reference voltage. An embodiment of reference generator circuit that limits variations in the common mode operating point is illustrated in FIG. 8. In various embodiments, reference generator 800 may correspond to either of reference generators 303a-b as depicted in the embodiment of FIG. 3.

In the illustrated embodiment, reference generator 800 includes current sources 803 and 809 coupled to Vp 815 and Vn 816, respectively. Vp 815 is further coupled to VDD via resistor 801 and Vn 816 is further coupled to VDD via resistor 802. Current sources 803 and 809 are also coupled to the output of amplifier 824. In various embodiments, amplifier 824 compares the voltage level of node 822 with vcmref 823 (a reference voltage for the common mode operating point). As described below in more detail, based on the voltage level of the output of amplifier 824, current sources 803 and 809 may limit the amount of current sunk from Vp 815 and Vn 816, thereby modifying the common mode operating point of Vp 515 and Vn 816, Amplifier 824 may be designed in accordance with one of various design styles. For example, in some embodiments, amplifier 824 may include a differential amplifier, or any other suitable amplifier circuit. Resistors 825, 826, and 821 generate a voltage level on node 822 that may, in various embodiments, correspond to the common mode operating point of Vp 815 and Vn 816. Values for resistors 825, 826, and 821 may be selected to limit the load place on Vp 815 and Vn 816 by amplifier 824. Resistors 825, 826, and 821 may be constructed from polysilicon, metal, or any other suitable conductive material, or combination thereof, available in a semiconductor manufacturing process.

Current sources 804 and 808 are also coupled to Vp 815 and Vn 816, respectively. Like current sources 803 and 809, the current sunk by current sources 804 and 808 is based on the voltage level of the output of amplifier 824. As with the previously described embodiments of reference generators, the current sunk by current sources 804 and 808 is also based on the value of signals included in tcode<n:1>.

During operation, current generated by current source 814 is selectively sunk from either Vp 815 or Vn 816 based on Sp 819 and Sn 820. As described above in regard to the other embodiments of reference generator circuits, Sp 819 and Sn 820 may be dependent on a value of a previously received symbol, and may generated by a DFE. The value of the current generated by current source 814 is dependent upon the output of amplifier 824 as well as tcode_N<2n:1>. It is noted that current source 814 may, in various embodiments, be capable of sinking twice the amount of current as any of current sources 803, 804, 808, and 809.

It is noted that the embodiment illustrated in FIG. 8 is merely an example. In other embodiments, different circuit blocks and different arrangements of circuit blocks are possible and contemplated.

Figure 9A:
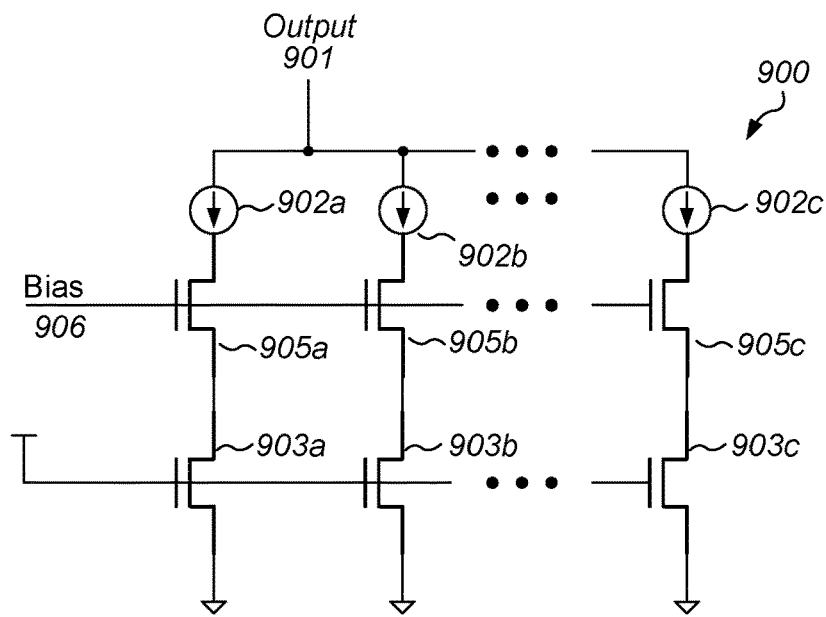
FIG. 9A is a block diagram of a current source using a bias signal.

As described above regarding FIG. 8, current sources used in a reference voltage generator circuit may include support for adjustments to the common mode operating point of the reference voltage generator circuit. An embodiment of a current source with such support is illustrated in FIG. 9A. In various embodiments, current source 900 may correspond to current sources 803 and 809 as depicted in the embodiment of FIG. 8.

In the illustrated embodiment, current source 900 includes current sources 902a-c, devices 905a-c, and devices 903a-c. Each of current sources 902a-c is coupled to a respective one of devices 905a-c, and each of devices 905a-c is coupled to a respective one of devices 903a-c.

In various embodiments, current sources 902a-c may include a biased device, portion of a current mirror, or any other suitable circuit configured to generate a desired current. The value of current sources 902a-c may, in some embodiments, be substantially the same. Although only three current sources are depicted in the embodiment of FIG. 9A, in other embodiments, any suitable number of current sources may be employed.

In the present embodiment, each of devices 905a-c is controlled by bias 906. In various embodiments, a voltage level of bias 906 may selected to set a particular operating point of devices 905a-c. By setting such an operating point, the resistance through each of devices 905a-c may set to a desired value, which may limit the amount of current that is sunk from output 901 via current sources 902a-c. In various embodiments, each of devices 905a-c may include one or more n-channel MOSFETs or any other suitable transconductance devices.

Each of devices 903a-c are coupled to a respective device of devices 905a-c. A control terminal of each of devices 603a-c is coupled to VDD. In various embodiments, each of devices 903a-c may include one or more n-channel MOSFETs, or any other suitable transconductance device. Although only three devices are depicted in current source 900, in other embodiments, any suitable number of devices may be employed.

Figure 9B:
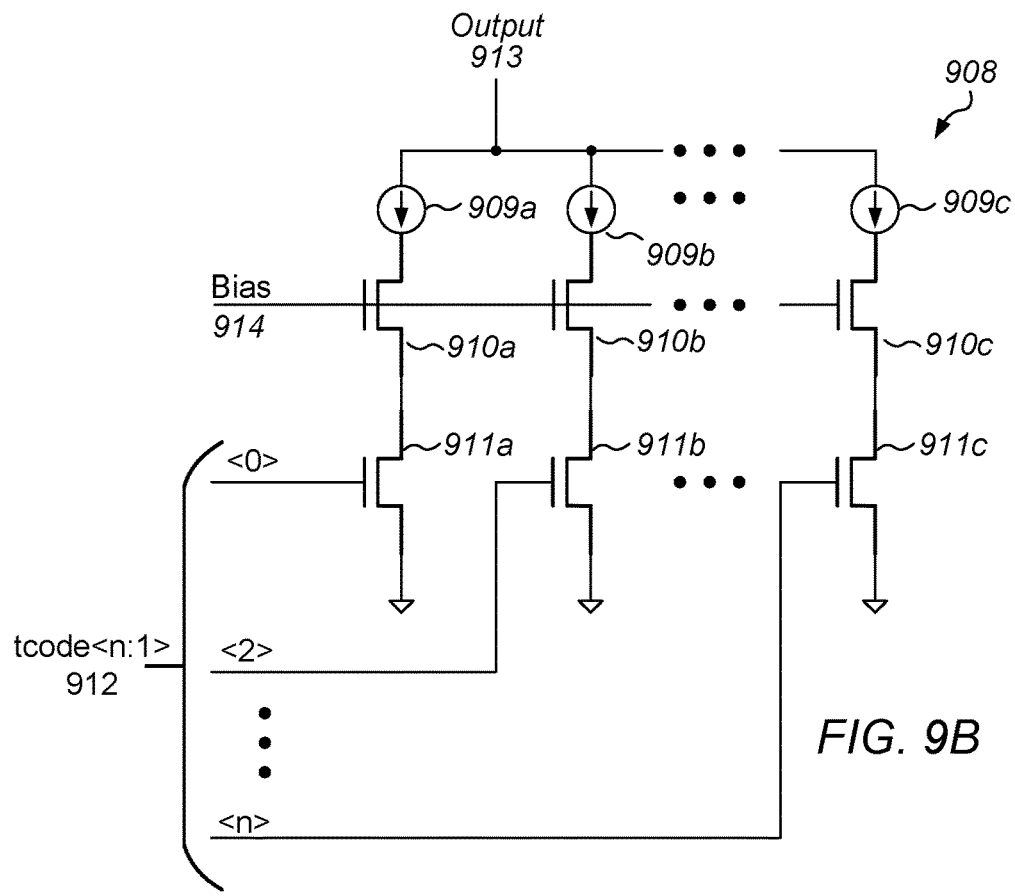
FIG. 9B is a block diagram of a variable current source using a bias signal.

During operation, a current is sunk from output 901 by each of current sources 602a-c as limited by the resistance of devices 905a-c. Each current sunk from output 901 by currents sources 902a-c flows to VSS via a corresponding one of devices 903a-c. It is noted that the embodiment depicted in FIG. 9 is merely an example, and that, in other embodiments, different circuit elements, and different arrangements of circuits elements may be employed.

As described above regarding FIG. 8, the value of the current sources may be varied in order to generate the desired reference voltage level. An embodiment of a variable current source is illustrated in the block diagram of FIG. 9B. In various embodiments, current source 908 may correspond to any of current sources 804, 808, and 814. It is noted that in cases where current source 908 corresponds to current source 814, additional devices and current sources may be employed.

In the illustrated embodiment, current source 908 includes current sources 909a-c, devices 910a-c, and devices 911a-c. Each of current sources 909a-c is coupled to output 913 and to a respective one of devices 910a-c. In various embodiments, each of current sources 909a-c may include a biased device, a portion of a current mirror, or any other suitable circuit configured to provide a desired current value.

In the present embodiment, each of devices 910a-c is controlled by bias 914. In various embodiments, a voltage level of bias 914 may selected to set a particular operating point of devices 910a-c. By setting such an operating point, the resistance through each of devices 910a-c may set to a desired value, which may limit the amount of current that is sunk from output 901 via current sources 909a-c. In various embodiments, each of devices 910a-c may include one or more n-channel MOSFETs or any other suitable transconductance devices.

In a similar fashion to the embodiment of FIG. 6B, devices 911a-c are controlled by tcode<n:1> 912 to determine the total current sunk from output 913. For example, device 911a is controlled by individual signal <1> of tcode<1:n> 912. In various embodiments, each of devices 911a-c may include one or more n-channel MOSFETs or any other suitable transconductance devices. Although three devices are depicted as being controlled by tcode<1:n> 912 in the present embodiment, in other embodiments, any suitable number of devices may be employed.

Figure 10:
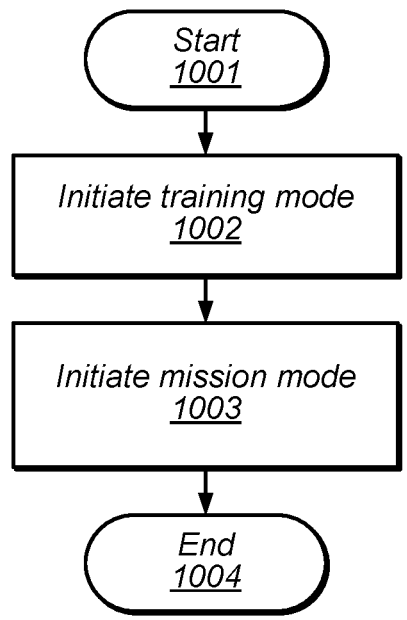
FIG. 10 illustrates a flow diagram depicting an embodiment a method operating a de-serialization circuit.

Turning now to FIG. 10, a flow diagram depicting an embodiment of a method for operating a de-serialization circuit with an adjustable voltage reference, such as, e.g., de-serialization circuit 300, is illustrated. The method begins in block 1001.

Interface units coupled to the serial communication links may then enter training mode (block 1002). As described above, during training mode, a particular interface unit may transmit a known data pattern to another interface unit. The receiving interface unit may then sample the known data pattern and adjust sampling points, reference voltage levels, and the like, in order to properly detect the known data pattern. In some cases, the receiving interface unit, may transmit information regarding any adjustments to sampling points, etc., to the sending interface unit, which may, in turn, modify how symbols are transmitted based on the received information.

Once the training of the serial communication links has been completed, mission mode may then be initiated (block 1003). As described below in more detail, a stream of symbols may be received during mission mode. As each symbol is received, a voltage level of a reference voltage may be adjusted based on previously received symbols. Once the level of the voltage reference has been adjusted, a voltage level corresponding to the current symbol may be compared to the voltage level of the reference voltage. By adjusting the voltage level of the reference voltage, interference from previous symbol, i.e., inter-symbol interference, may be reduced or minimized.

Mission mode may remain active until the serial communication link is deactivated, at which point the method concludes in block 1004. It is noted that the method illustrated in the flow diagram of FIG. 10 is merely an example. In other embodiments, different operations, and different orders of operations are possible and contemplated.

Figure 11:
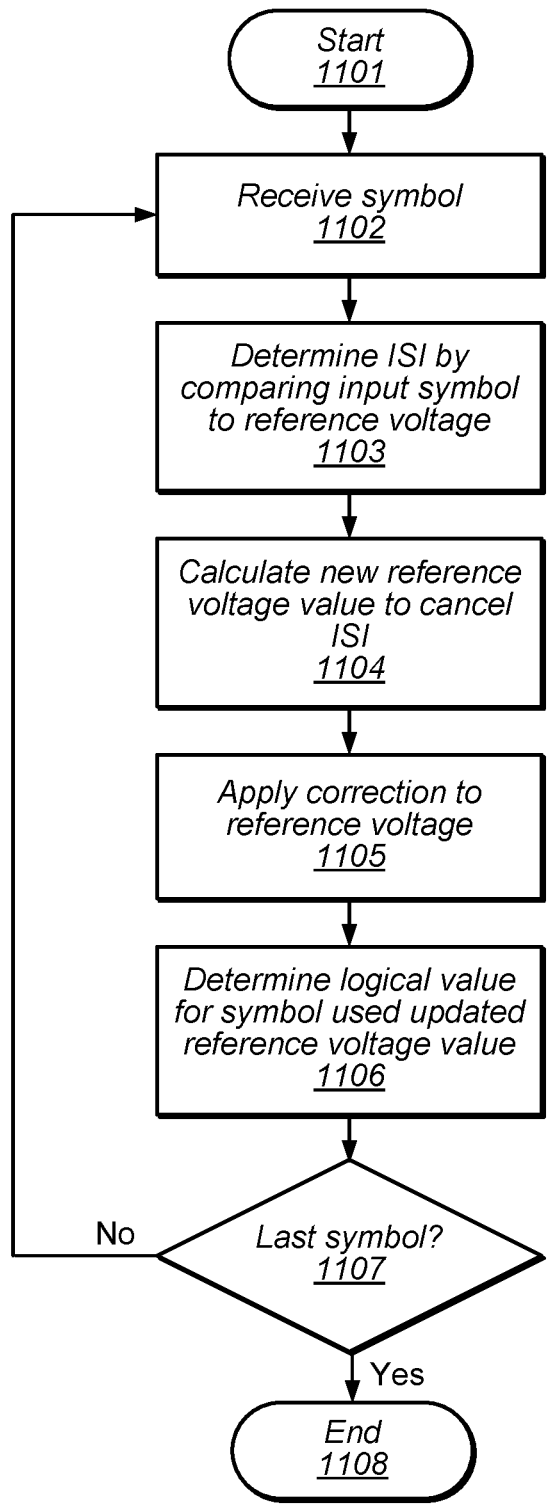
FIG. 11 illustrates a flow diagram depicting an embodiment of a method for operating a de-serialization circuit in mission mode using an adjustable voltage reference.

Turning to FIG. 11, a flow diagram depicting an embodiment of a method for operating an interface unit in mission mode is illustrated. The method begins in block 1101. A symbol may then be received by an interface unit, such as interface unit 160a, for example (block 1102). In various embodiments, the symbol may be included in a stream of symbols transmitted from another interface unit via a serial communication channel, such as, serial communication channel 120a, for example.

ISI may then be determined by comparing the input symbol to a reference voltage (block 1103). In various embodiments, the comparison may be performed using a differential amplifier, comparator, or any other suitable circuit. In some cases, the reference voltage may be differentially encoded as a difference in voltage levels between two signals. For example, the reference voltage may be encoded as a difference in the voltage levels between signals Vp 515 and Vn 516 as depicted in FIG. 5.

Based on results of the comparison of the input symbol to the reference voltage, a new value for the reference voltage may be calculated (block 1104). In various embodiments, the new value of the reference voltage may cancel at least part of the ISI. The calculation of the new reference voltage may include determining both the sign, i.e., whether to increase or decrease the value of the reference voltage, and magnitude of the reference voltage.

Once the new value of the reference voltage has been determined, the correction to the reference voltage may then be applied (block 1105). In various embodiments a current may be sunk from a particular one of the two signals encoding the reference voltage value. For example, in the embodiment depicted in FIG. 3, a current generated by current source 512 may be sunk from Vn 516 in response to a logical-1 value on Sp 519. In some embodiments, the value of Sp 519 may be depend on a symbol received prior to the symbol currently being processed. By selectively sinking currents from the two signals encoding the reference voltage, the voltage level of the reference voltage may be rapidly switched between multiple values allowing for the processing of high-speed streams of symbols.

It is noted that, in some embodiments in order to compensate for inter-symbol interference of multiple previous symbols, the value of the reference voltage may be adjusted based on values of two symbols received prior to the symbol currently being processed, as described above in regard to FIG. 7. By using multiple current sources to selectively sink current from the voltage signals used to encode the reference voltage, the voltage level of the reference voltage may be rapidly switched between different values for sampling high-speed symbol streams.

Once the level of the voltage reference has been adjusted, a logical value for the current symbol may be selected based on the adjusted voltage reference (block 1106). In various embodiments, a decision circuit, such as, e.g., decision circuit 302, may compare a voltage level output from a linear equalizer to the voltage level of the adjusted voltage reference, and determine a logical value for the current symbol based on results of the comparison. The method then depends on if the current symbol is the last symbol (block 1107).

If the current symbol is the last symbol, the method concludes in block 1108. Alternatively, if additional symbols are being received, then the method may continue from block 1102 as described above.

Although the operations included in the method illustrated in the flow diagram of FIG. 11 are depicted as being performed in serial fashion, in other embodiments, one or more of the operations may be performed in parallel.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An, apparatus, comprising:
a first current source configured to sink a first current from a first output node, where a value of the first current is based on a first control signal, and wherein the first output node is coupled to a power supply via a first resistor;
a second current source configured to sink a second current from a second output node, wherein a second value of the second current is based on the first control signal, and wherein the second output node is coupled to the power supply via a second resistor;
a third current source configured to sink a third current whose, wherein a third value of the third current is based on a second control signal;
a first device configured to couple, based on a particular data symbol included in a serial data stream received via a serial communication link, the third current source to the first output node; and
a second device configured, based on the particular data symbol, to couple the third current source to the second output node.

2. The apparatus of claim 1, further comprising a fourth current source coupled to the first output node, and a fifth current source coupled to the second output node, wherein a fourth value of the fourth current source, and a fifth value of the fifth current source are fixed.

3. The apparatus of claim 1, further comprising a resistor network configured to generate a common mode voltage based on a first voltage level of the first output node, and a second voltage level of the second output node.

4. The apparatus of claim 3, further comprising an amplifier configured to compare the common mode voltage and a common mode reference voltage to generate a bias signal.

5. The apparatus of claim 4, wherein the first current source is further configured to adjust the value of the first current using the bias signal.

6. The apparatus of claim 1, wherein the first device and the second device each include at least one n-channel metal-oxide semiconductor field-effect transistor (MOSFET).

7. A method, comprising:
receiving, by an interface circuit, a particular data symbol of a plurality of data symbols included in a serial data stream;
sinking a first current from a first output node coupled to a power supply via a first resistor;
sinking a second current from a second output node coupled to the power supply via a second resistor;
adjusting respective values of the first current and the second current using a first set of control bits; and
sinking, based on a value of the particular data symbol, a third current from either the first output node or the second output node.

8. The method of claim 7, further comprising adjusting a third value of the third current using a second set of control data bits.

9. The method of claim 7, wherein sinking, based on the value of the particular data symbol from either the first output node or the second output node includes:
in response to determining the particular data symbol has a particular value, activating a first device coupled between the first output node and a third current source configured to generate the third current; and
otherwise, activating a second device coupled between the second output node and the third current source.

10. The method of claim 7, further comprising, generating, by a resistor network, a common mode voltage using a first voltage level of the first output node and a second voltage level of the second output node.

11. The method of claim 10, further comprising comparing, by an amplifier circuit, the common mode voltage and a reference voltage to generate a bias signal.

12. The method of claim 11, further comprising adjusting the value of the first current using the bias signal.

13. An apparatus, comprising:
a reference generator circuit configured to:
sink a first current from a first signal node;
sink a second current from a second signal node; and
select, based on a value of a particular data symbol included in a serial data stream, either the first signal node or the second signal node;
sink a third current from a selected one of the first signal node or the second signal node; and
a decision circuit configured to generate an output data value based on a comparison of a different data symbol included in the serial data stream and a difference in respective voltage levels of the first signal node and the second signal node, wherein the different data symbol is received after the particular data symbol is received.

14. The apparatus of claim 13, wherein the reference generator circuit is further configured to adjust a first value of the first current and a second value of the second value using a first set of control data bits.

15. The apparatus of claim 14, wherein the reference generator circuit is further configured to adjust a third value of the third current using a second set of control data bits.

16. The apparatus of claim 13, wherein to sink the third current from the selected one of the first signal node or the second signal node, the reference generator circuit is further configured to:
activate a first device coupled between the first signal node and a third current source configured to generate the third current; and
otherwise, activate a second device coupled between the second signal node and the third current source.

17. The apparatus of claim 14, wherein the reference generator circuit includes a resistor network configured to generate a common mode voltage using a first voltage level of the first signal node and a second voltage level of the second signal node.

18. The apparatus of claim 17, wherein the reference generator circuit is further configured to compare the common mode voltage and a reference voltage to generate a bias signal.

19. The apparatus of claim 18, wherein the reference generator circuit is further configured to adjust the value of the first current using the bias signal.

20. The method of claim 7, further comprising, sinking, based on a value of a different data symbol, a fourth current from either the first output node or the second output node, wherein the different data symbol was received prior to the particular data symbol.

* * * * *

UNITED STATES PATENT AND TRADEMARK OFFICE
CERTIFICATE OF CORRECTION

| | |
|---|---|
| PATENT NO. | : 10,778,478 B2 |
| APPLICATION NO. | : 16/504958 |
| DATED | : September 15, 2020 |
| INVENTOR(S) | : Kumar et al. |

It is certified that error appears in the above-identified patent and that said Letters Patent is hereby corrected as shown below:

In the Drawings

On sheet 4 of 11, in FIG. 4, Line 12, delete "Begining" and insert -- Beginning --, therefor.

In the Specification

In Column 3, Line 20, delete "e.g," and insert -- e.g., --, therefor.

In Column 5, Line 36, delete "a a" and insert -- a --, therefor.

In Column 9, Line 9, delete "$V_m=VDD-IR$" and insert -- $V_{cm}=VDD-IR$ --, therefor.

In Column 10, Line 23, delete "transdconductance" and insert -- transconductance --, therefor.

In the Claims

In Column 15, Line 15, in Claim 1, delete "An, apparatus," and insert -- An apparatus, --, therefor.

Signed and Sealed this
Eleventh Day of May, 2021

Drew Hirshfeld
*Performing the Functions and Duties of the
Under Secretary of Commerce for Intellectual Property and
Director of the United States Patent and Trademark Office*